United States Patent

Bailey

[11] 4,057,105
[45] Nov. 8, 1977

[54] SELF-CLEANING SCREEN ASSEMBLY FOR RADIATORS AND METHOD

[75] Inventor: John M. Bailey, Dunlap, Ill.

[73] Assignee: Caterpillar Tractor Co., Peoria, Ill.

[21] Appl. No.: 701,335

[22] Filed: June 30, 1976

[51] Int. Cl.² .................. F28F 19/00; F28G 13/00
[52] U.S. Cl. ........................... 165/119; 55/268;
  55/290; 55/295; 55/293; 55/299; 55/302;
  55/304; 55/351; 55/385 B; 165/41; 180/68 P
[58] Field of Search .................. 165/41, 44, 119;
  55/290, 295, 296, 299, 302, 293, 385 B, 351,
  304, 268; 180/68 P

[56] References Cited

U.S. PATENT DOCUMENTS

| 736,596 | 8/1903 | Grondahl | 210/386 |
|---|---|---|---|
| 1,983,294 | 12/1934 | Huttenmiller | 165/119 |
| 2,796,141 | 6/1957 | Schreiner | 165/119 |
| 3,302,795 | 2/1967 | Jacobs | 55/351 |
| 3,309,847 | 3/1967 | Donaldson | 55/351 |
| 3,344,854 | 10/1967 | Boyajian | 165/119 |
| 3,827,482 | 8/1974 | Pope | 165/119 |

Primary Examiner—Ronald H. Lazarus
Assistant Examiner—Sheldon Richter
Attorney, Agent, or Firm—Phillips, Moore, Weissenberger, Lempio & Majestic

[57] ABSTRACT

A plurality of perforated endless belts are disposed in circumventing relationship about a radiator. At least one roller is disposed on either side of the radiator to engage and guide the belts with one of the rollers being motor-driven. A vertically disposed guide bracket is mounted on the cooling air exit side of the radiator, intermediate the lateral sides thereof, to engage and guide the belts thereacross. An arcuate guide plate, having a plurality of holes formed therethrough, is mounted on the cooling air inlet side of the radiator to engage and guide the belts thereacross. In the preferred embodiment of this invention, each belt is half-twisted to form a "mobius strip" whereby the belt will turn over as it passes through the guide bracket to facilitate debris removal and to reduce cooling air pressure loss.

15 Claims, 9 Drawing Figures

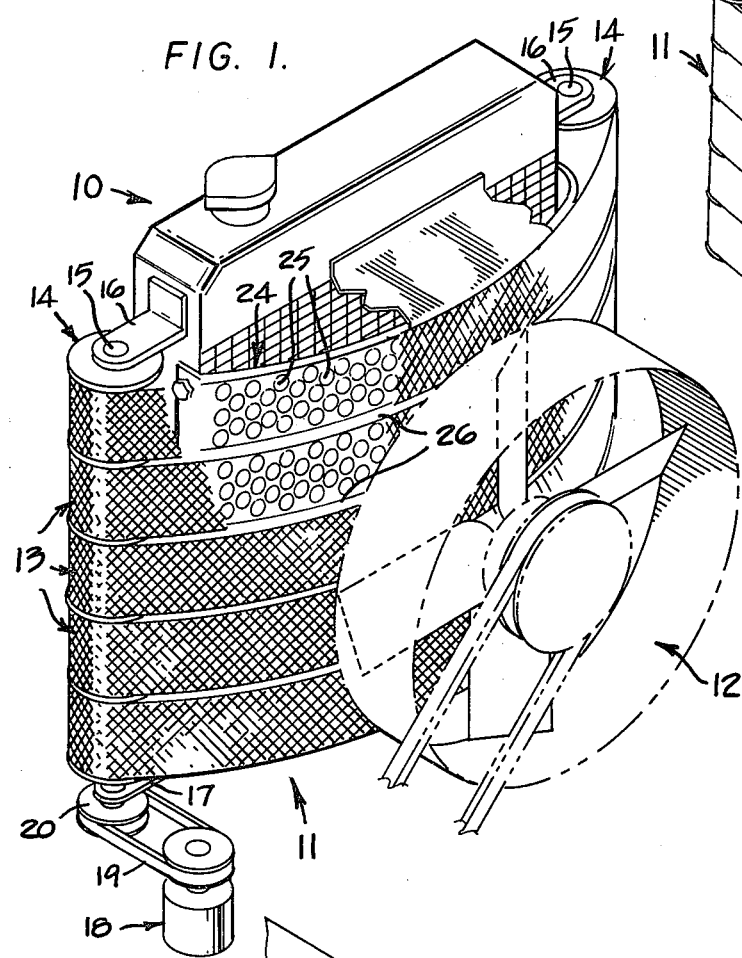
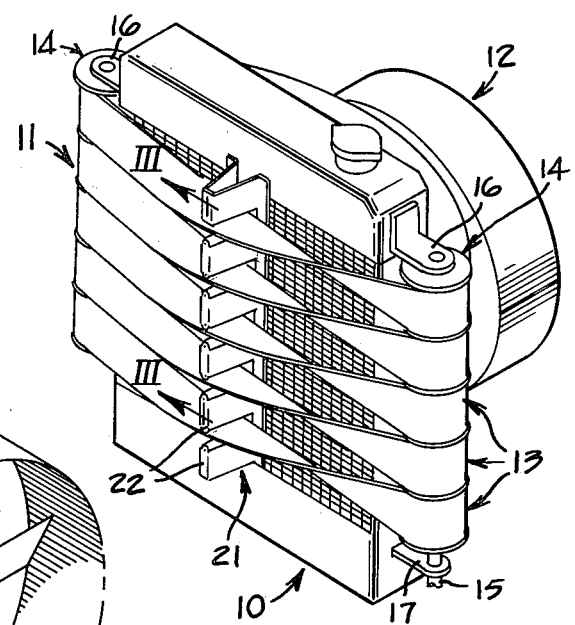
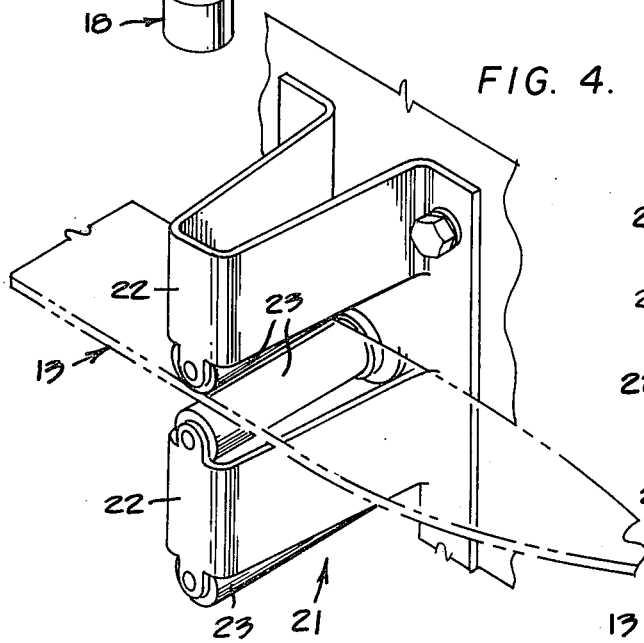
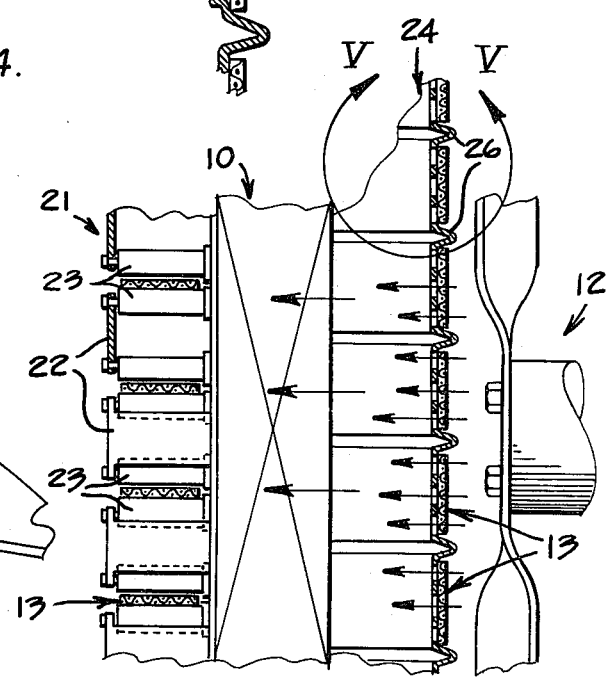

1

SELF-CLEANING SCREEN ASSEMBLY FOR RADIATORS AND METHOD

BACKGROUND OF THE INVENTION

The water-cooled radiator employed on a construction vehicle, such as a log skidder, is subjected to plugging due to the ingress of debris therein. Such plugging is a particular problem with respect to radiators comprising closely spaced fins for the purpose of improving cooling capabilities and/or for reducing radiator core size. Proposed solutions to the plugging problem have included constructing the radiator with less than nine fins per inch and mounting screens in front of the radiator to screen-out debris prior to its ingress into the radiator. Such arrangements require close attention and periodic cleaning to maintain the cooling capacity of the radiator at an acceptable level.

SUMMARY OF THIS INVENTION

An object of this invention is to provide an economical and non-complex self-cleaning screen assembly for radiators which requires minimal servicing and which substantially eliminates the above discussed plugging problem.

The self-cleaning screen assembly comprises a horizontally disposed and perforated endless belt means circumventing the radiator, and vertically disposed first guide means mounted on either lateral side thereof to engage and guide the belt means thereover. A vertically disposed second guide means is mounted on an outboard or front side of the radiator whereas a horizontally disposed third guide means is mounted on an inboard or back side of the radiator with such guide means functioning to also engage and guide the belt means thereover.

In the preferred embodiment of this invention and in carrying forth the method steps thereof, a plurality of individual belts comprising the belt means are each half-twisted during rotation thereof to form a "mobius strip" to aid in the self-cleaning function.

BRIEF DESCRIPTION OF THE DRAWINGS

Other objects of this invention will become apparent from the following description and accompanying drawings wherein:

FIG. 1 is an air inlet side isometric view of a radiator having a self-cleaning screen assembly of this invention associated therewith;

FIG. 2 is an air outlet side isometric view of the screen assembly;

FIG. 3 is a sectional view of the radiator and screen assembly, generally taken in the direction of arrows III—III in FIG. 2;

FIG. 4 is an enlarged isometric view of a pair of guide members employed in the screen assembly;

FIG. 5 is an enlarged sectional view, generally taken within circle V—V in FIG. 3;

DETAILED DESCRIPTION

Figure 6:
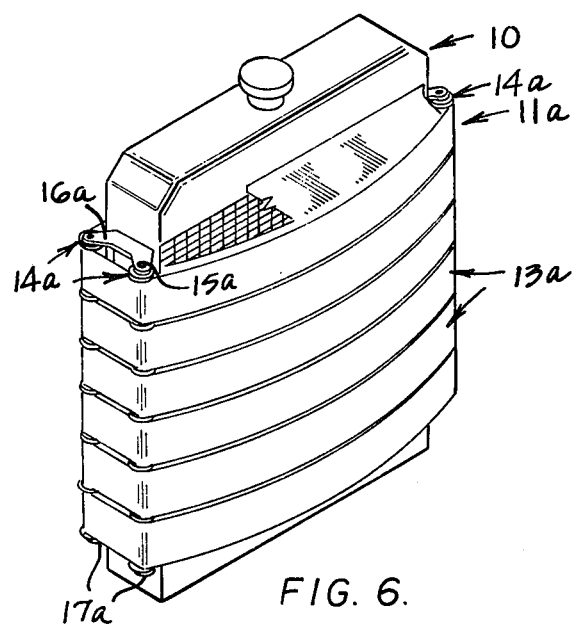
FIG. 6 is a view similar to FIG. 1, but illusrating a modification of guide and drive rollers employed in the screen assembly.

FIG. 1 illustrates a conventional water-cooled radiator 10 having a self-cleaning screen assembly 11 of this invention associated therewith. An engine driven fan assembly 12 of the blower-type is adapted to be mounted in an engine compartment on the inboard or back side of the radiator to aid in blowing air therethrough. As will be hereinafter more fully understood, screen assembly 11 will function to pick-up any debris prior to its ingress into the radiator and automatically discharge the same on the outboard or front side thereof and exteriorly of a vehicle. Modifying the assembly 11 a suction fan could be used.

The screen assembly illustrated in FIGS. 1-5 comprises a plurality of horizontally disposed and perforated endless belt means or belts 13 which circumvent the radiator. Each belt may comprise a fine mesh screen construction, composed of rubber, rubberized fabric, high-strength stainless steel, plastic or any other suitable material which will flex and provide the other operational desiderata hereinafter described. The lateral ends of the flexible belt engages and is guided by vertically disposed first guide means or rollers 14, mounted on either lateral end of the radiator. In particular, each roller is secured to a vertically disposed shaft 15 having its opposite ends suitably rotatably mounted in vertically spaced brackets 16 and 17, secured to a respective side of the radiator. Alternatively, a separate roller may be provided for each belt 13.

FIG. 1 further schematically illustrates drive means for continuously rotating the belts during operation of the vehicle. Such drive means may comprise an electric, hydraulic or air-actuated motor 18. The motor may be suitably mounted on the frame of the vehicle to have its output shaft drive a belt 19, entrained about a pulley 20 secured on the lower end of shaft 15 to rotate a roller 14. Alternatively, a small windmill type device, driven by the air stream emanating from fan assembly 12, could be employed as the drive means to rotate roller 14.

As shown in FIGS. 2-4, belt means 13 are supported on the front side of the radiator by a vertically disposed first guide means comprising a bracket 21. The bracket is secured intermediate the lateral ends of the radiator and has a plurality of equally and vertically spaced guide members 22 extending forwardly therefrom. Each pair of vertically adjacent guide members has a roller 23 rotatably mounted thereon to define a guide opening therebetween for engaging and guiding a particular belt therethrough.

Each belt is preferably half-twisted, as clearly shown in FIG. 2, to form a "mobius strip". Such twisting will function to turn the belt completely over as it moves past the front side of the radiator to expose both sides thereof to the air stream forced therethrough by fan assembly 12. Thus, debris carried by the belts will be blown-off the belt and dumped exteriorly of the vehicle. It should be further noted that the arrangement of guide means 21 may further induce a slight fluttering of the belts to further aid in the dislodgement of debris therefrom. However, the clearence defined between each pair of adjacent rollers 23 is sufficiently small to minimize vibrations imparted to the belt while yet permitting a slight fluttering thereof due to its extended length between the guide means and each roller 14.

Referring to FIGS. 1, 3 and 5, each belt is guided on the cooling air inlet side of radiator 10 by a horizontally disposed third guide means comprising an arcuate guide plate 24. The guide plate is secured at its lateral ends to the ends of the radiator with the intermediate mid-portion of the plate being spaced at a maximum distance from the radiator. As shown, the guide plate may be stamped from a relatively thin sheet of metal to have a plurality of holes 25 formed therethrough and may have an upper plate and a bottom plate (not shown) secured between it and the radiator to prevent the ingress of foreign materials therebetween. In addition, a plurality of vertically spaced and horizontally disposed guide ribs 26 are formed integrally on the plate with each of vertically adjacent ribs receiving a belt 13 therebetween.

As more clearly shown in FIG. 5, ribs 26 function to entrap and to prevent vertical movement of the belt. Holes 25 are formed sufficiently large to assure a relatively unrestricted flow of air therethrough and to provide a minimal metal contact with the belt means. If so desired, the metallic portions of the guide plate, engaging the belt, could be chrome plated or provided with any other suitable low friction surface thereon (e.g., Teflon) to further reduce the coefficient of friction between the belt and the guide plate.

In view of the above description, it can be seen that the self-cleaning screen assembly of this inventiion permits a relatively close spacing of the radiator fins together (e.g., more than nine fins per inch) and also assures that the radiator will function substantially up to its full cooling capacity, even when operating in heavy dirt and debris laden environments. The half-twist imparted to each belt 13 aids in the cleaning function, as above described, and also exposes a different side thereof to guide plate 24 upon each complete rotation of the belt means to reduce belt wear by approximately one-half. Also, by providing a substantially open structure at the air exit side, pressure loss normally caused by the screen is reduced by approximately 50%.

Figure 7:
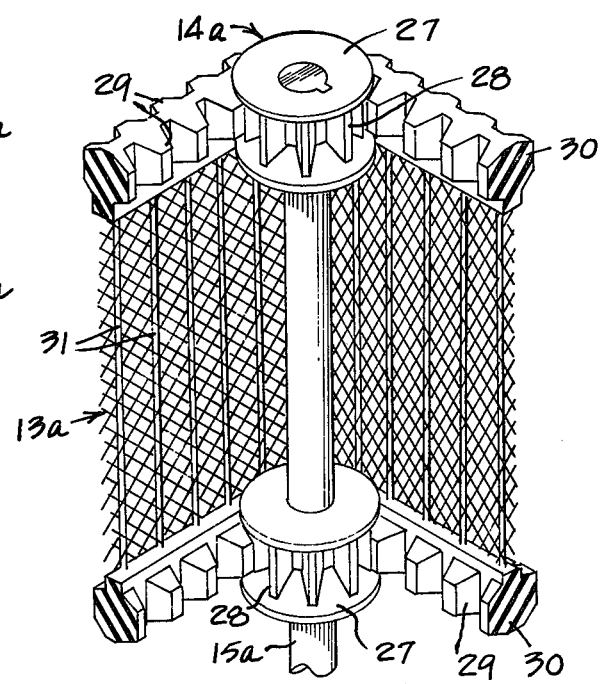
FIG. 7 is a fragmentary view illustrating one of the FIG. 6 guide and drive rollers.

FIGS. 6–9 illustrate modifications of the FIGS. 1–5 screen assembly wherein identical numerals depict corresponding construction, but with numerals depicting modified constructions in FIGS. 6–9 being accompanied by a subscript "a" or "b". In FIGS. 6 and 7, a self-cleaning screen assembly 11a comprises a plurality of belts 13a engaged and guided by a modified guide means mounted on either lateral end of radiator 10. Each such guide means further aids in the driving function and comprises a pair of sprocket and guide assemblies 14a mounted for rotation between a pair of brackets 16a secured to a respective side of the radiator.

As shown in FIG. 7, each sprocket assembly may comprise a shaft 15a, having a plurality of vertically spaced rollers or sprocket members 27 secured thereon for rotation therewith. Each sprocket member has a plurality of radial teeth 28 formed thereon adapted to engage like-shaped teeth 29 formed on a flexible and reinforced rubber drive belt 30, secured to a respective edge of a belt 13a. The main body of the belt may be composed of the type of screen-like material described above and may be further reinforced by a plurality of vertically disposed and horizontally spaced metallic rods 31 secured between each pair of belts 30.

One of the shafts 15a may be rotated by drive means, such as motor 18 in FIG. 1, to thus rotate the integrated belt means about the radiator. The guide means employed on the front side of the radiator may correspond to guide means 21 of the above described screen asembly. The employment of a pair of guide means 14a on each end of the radiator provides space-saving desiderata in that the belts may be disposed closer to the ends of the radiator in contrast to the single roller arrangement of FIGS. 1–5.

Figure 8:
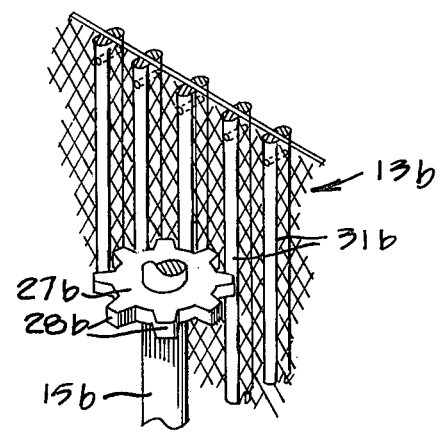
FIG. 8 is a fragmentary view of another modification of the guide and drive roller.

FIG. 8 illustrates a modification of the FIG. 7 combined guide and drive means for each belt 13b. The belt has a plurality of vertically disposed reinforced rods 31b secured thereon for tracked engagement with teeth 28b of a roller or sprocket member 27b. The sprocket is secured to a shaft 15b which corresponds to shaft 15a in FIG. 7. The rods are exposed on each side of the belt since the belt, when conforming to a "mobius strip" will flop over during each rotation thereof.

Figure 9:
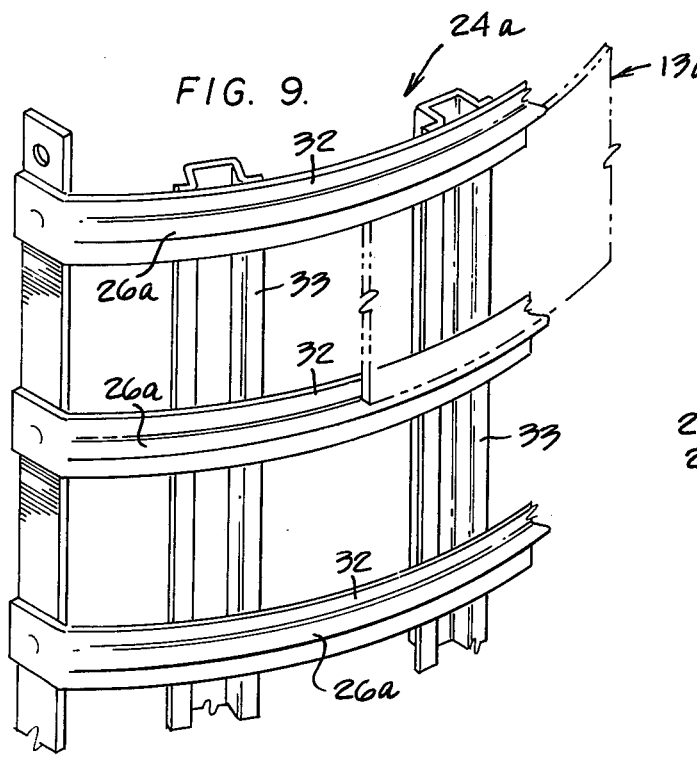
FIG. 9 is a fragmentary view of a modified guide plate which may be employed in the screen assembly.

FIG. 9 discloses a modification 24a of guide plate 24 (FIG. 1) mounted on the back side of the radiator to guide belts 13 or 13a thereacross. In such modifications, each belt is disposed between a pair of horizontally dispossed and vertically spaced guide ribs 26a formed integrally on cross members 32, secured to vertically disposed and horizontally spaced reinforcing members 33. The grid structure thus formed by members 32 and 33 defines a plurality of large openings for permitting the free flow of air therethrough.

I claim:

1. A self-cleaning screen assembly in combination with a vertically disposed radiator comprising
    perforated endless belt means circumventing said radiator comprising a plurality of horizontally disposed and vertically spaced endless belts each half-twisted to form a "mobius strip",
    first guide means mounted on either end of said radiator for engaging and guiding said belt means thereover,
    second guide means mounted on a first side of said radiator for engaging and guiding said belt means thereover comprising a vertically disposed bracket secured on the first side of said radiator intermediate the lateral side thereof and wherein said bracket has a plurality of vertically spaced guide members secured thereon to extend forwardly of said radiator, each pair of vertically adjacent guide members defining a guide opening there between having one of said belts disposed therein,
    third guide means mounted on a second side of said radiator, opposite to said first side thereof, for engaging and guiding said belt means thereover, and
    drive means drivingly connected to said belt means for moving said belt means about said radiator.

2. The self-cleaning screen assembly of claim 1 wherein each of said guide members has a roller rotatably mounted thereon with the rollers mounted on each pair of vertically adjacent members defining a said guide opening therebetween.

3. The self-cleaning screen assembly of claim 1 further comprising a fan assembly of the blower-type mounted adjacent to the second side of said radiator.

4. The self-cleaning screen assembly of claim 1 wherein said third guide means comprises a grid structure including a plurality of horizontally disposed and vertically spaced cross members, each having a guide rib formed integrally thereon, and a plurality of vertically disposed and horizontally spaced reinforcing members secured to said cross members, said belt means comprising a plurality of vertically disposed belts with one of said belts disposed between each pair of vertically adjacent guide ribs.

5. The self-cleaning screen assembly of claim 1 wherein said third guide means comprises a plate secured to the second side of said radiator, said plate having a plurality of holes formed therethrough.

6. The self-cleaning screen assembly of claim 5 wherein said plate is arcuate with its mid-portion intermediate the lateral ends of said radiator being spaced at a maximum distance therefrom.

7. The self-cleaning screen assembly of claim 5 wherein said plate has a plurality of horizontally disposed guide ribs formed integrally therewith, each pair of vertically adjacent guide ribs having one of said belts disposed therebetween.

8. The self-cleaning screen assembly of claim 1 wherein each of said belts comprises a fine mesh screen.

9. The self-cleaning screen assembly of claim 8 wherein the material composing each said belt is selected from the group consisting of rubber, rubberized fabric, high-strength stainless steel and plastic.

10. The self-cleaning screen assembly of claim 1 wherein said first guide means comprises at least one vertically disposed roller mounted for rotation between a pair of vertically spaced brackets secured on a respective lateral end of said radiator.

11. The self-cleaning screen assembly of claim 10 wherein a single said roller is mounted on a shaft mounted between said brackets and wherein said belt means comprises a plurality of belts entrained over said roller.

12. The self-cleaning screen assembly of claim 10 wherein a plurality of rollers are mounted on a shaft mounted between said brackets and wherein said belt means comprises a plurality of belts each entrained over a respective one of said rollers.

13. The self-cleaning screen assembly of claim 12, wherein each of said belts further comprises a fine mesh screen having a plurality of vertically disposed and horizontally spaced rods secured thereto and wherein each of said rollers comprises a sprocket member having a plurality of radial sprocket teeth formed thereon to engage and drive said rods.

14. The self-cleaning screen assembly of claim 12 wherein said rollers are secured to said shaft for rotation therewith and each roller comprises a sprocket member having a plurality of radial sprocket teeth formed thereon.

15. The self-cleaning screen assembly of claim 14 wherein each said belt comprises a fine mesh screen having a pair of flexible drive belts, each having a plurality of teeth formed thereon, secured on opposite edges thereof, the teeth of said roller meshing with teeth of each of said drive belts.

* * * * *